United States Patent [19]

Schöllhorn et al.

[11] Patent Number: 5,078,765
[45] Date of Patent: Jan. 7, 1992

[54] FILTER INSERT RECEIVED EXCHANGEABLY BY A SHAFT ALONG A CHANNEL

[75] Inventors: Markus Schöllhorn, Sindelfingen; Wolfgang Volz, Magstadt; Klaus Arold, Sindelfingen; Helmut Merk, Herrenberg; Heinz Koukal, Sindelfingen, all of Fed. Rep. of Germany

[73] Assignee: Daimler-Benz AG, Fed. Rep. of Germany

[21] Appl. No.: 433,111

[22] Filed: Nov. 8, 1989

[30] Foreign Application Priority Data

Nov. 9, 1988 [DE] Fed. Rep. of Germany ....... 3837968

[51] Int. Cl.$^5$ .................................... B01D 46/00
[52] U.S. Cl. .................................. 55/481; 55/482; 55/502
[58] Field of Search .................... 55/481, 502, 482

[56] References Cited

U.S. PATENT DOCUMENTS

| 3,816,984 | 6/1974 | Neumann | 55/481 |
| 3,849,092 | 11/1974 | Bakke et al. | 55/302 |
| 4,765,810 | 8/1988 | Wetzel | 55/502 |
| 4,839,048 | 6/1989 | Reed | 55/502 |

FOREIGN PATENT DOCUMENTS

| 2732596 | 2/1978 | Fed. Rep. of Germany. | |
| 3126089 | 1/1983 | Fed. Rep. of Germany | 55/502 |
| 3317851 | 3/1984 | Fed. Rep. of Germany. | |
| 3729181 | 3/1988 | Fed. Rep. of Germany. | |
| 8808009 | 9/1988 | Fed. Rep. of Germany. | |
| 52-30978 | 9/1977 | Japan | 55/502 |
| 6710369 | 5/1968 | Netherlands. | |

OTHER PUBLICATIONS

IBM Technical Disclosure Bulletin, vol. 13, No. 2, Jul. 1970.

Primary Examiner—Bernard Nozick
Attorney, Agent, or Firm—Wands, Edwards, Lenahan & McKeown Evenson

[57] ABSTRACT

In a filter insert which is received exchangeably in a shaft along a channel and which can be fixed sealingly relative to frame shaped shaft walls via at least one gasket preferably continuous on a flow-off side of the filter, it becomes possible to change the filter easily, without the danger of damaging the gasket, if there is at least one pressing element which can be connected to a pressure reducing device. When the pressing element is in the contracted pressure reduced position, a continuous gap forms between the gasket and associated shaft wall during a shift of the filter, this gap being cancelled when the pressure reducing device is disconnected.

17 Claims, 2 Drawing Sheets

FILTER INSERT RECEIVED EXCHANGEABLY BY A SHAFT ALONG A CHANNEL

BACKGROUND AND SUMMARY OF THE INVENTION

The invention relates to a filter insert which is received exchangeably by a shaft along a channel and which can be fixed sealingly relative to the frame shaped shaft walls via at least one gasket preferably continuous on the flow-off side.

A filter arrangement of this type with a filter which can be pulled off upwards is disclosed by German Published, Unexamined Patent Application 3,317,851. Since, in practice, unfiltered air which can pass through between the filter and the associated channel wall must reliably be prevented from entering the interior, a filter receptacle consisting of two frames spaced from one another is used. The frames are connected sealingly to the channel wall and surround an upwardly open shaft which can be closed by a removeable cover and which receive the filter. In this arrangement, a continuous gasket, against which the filter is Pressed, is intended to prevent leakage air bypassing the filter from passing between the latter and the frame and into the passenger space.

If, in this respect, a high pressure force is adopted to obtain a good sealing effect, considerable effort is required to change the filter and there is the danger that the gasket will be damaged. A lower pressure force, although making the exchange operation easier and reducing the danger of damage to the gasket, nevertheless decreases the protection against leakage.

An object of the present invention it to provide an arrangement making it possible to change the filter easily and, at the same time, ensuring that unfiltered air is prevented from overflowing into the passenger space during the operation of the filter.

This object and other objects are achieved according to advantageous embodiments of the present invention by providing a pressing element for forming a gap between a gasket and associated bearing surface as a result of a reduction of pressure in the Pressing element during removal of the filter. This allows the filter to be changed without damaging the gasket A higher pressure which thereafter takes effect again, and which can be above atmospheric pressure or correspond to this, guarantees, during filter operation, that the gasket bears sealingly against the associated sealing surface.

At the same time, the pressing element can be arranged on a side opposite the continuous gasket, so that it merely gives rise to a shifting movement in the direction of extension of the channel.

In a preferred exemplary embodiment of the invention, the pressing element is designed as a substantially continuous tube which is made of elastic material and which one end is closed, another end of which is equipped with a connection piece.

It is also possible, however, to design the pressing element as a hollow chamber closed on itself, with a connection piece leading away from it.

In such an embodiment of the pressing element, wall regions of the hollow chamber can be formed by fixed wall parts especially on the same side as the filter. The channel thus created can then be bridged by a diaphragm-like sealing element.

If the pressing element is designed as a hollow chamber closed on itself, to simplify the construction, the pressing element can perform the function of the gasket.

For an especially stable design of the pressing element, this can be arranged on the shaft. Another advantage of this is that, when the filter is being changed the line leading to the pressure reducing device does not have to be detached.

The filter can be divided transversely relative to the direction of flow and the pressing element be received by a groove of the division. This design makes it possible in a simple way to connect a dust filter and an absorption filter in series.

Other objects, advantages and novel features of the present invention will become apparent from the following detailed description of the invention when considered in conjunction with the accompanying drawings.

DETAILED DESCRIPTION OF THE DRAWINGS

Various exemplary embodiments of the invention are explained in detail below with reference to the drawings.

Figure 1:
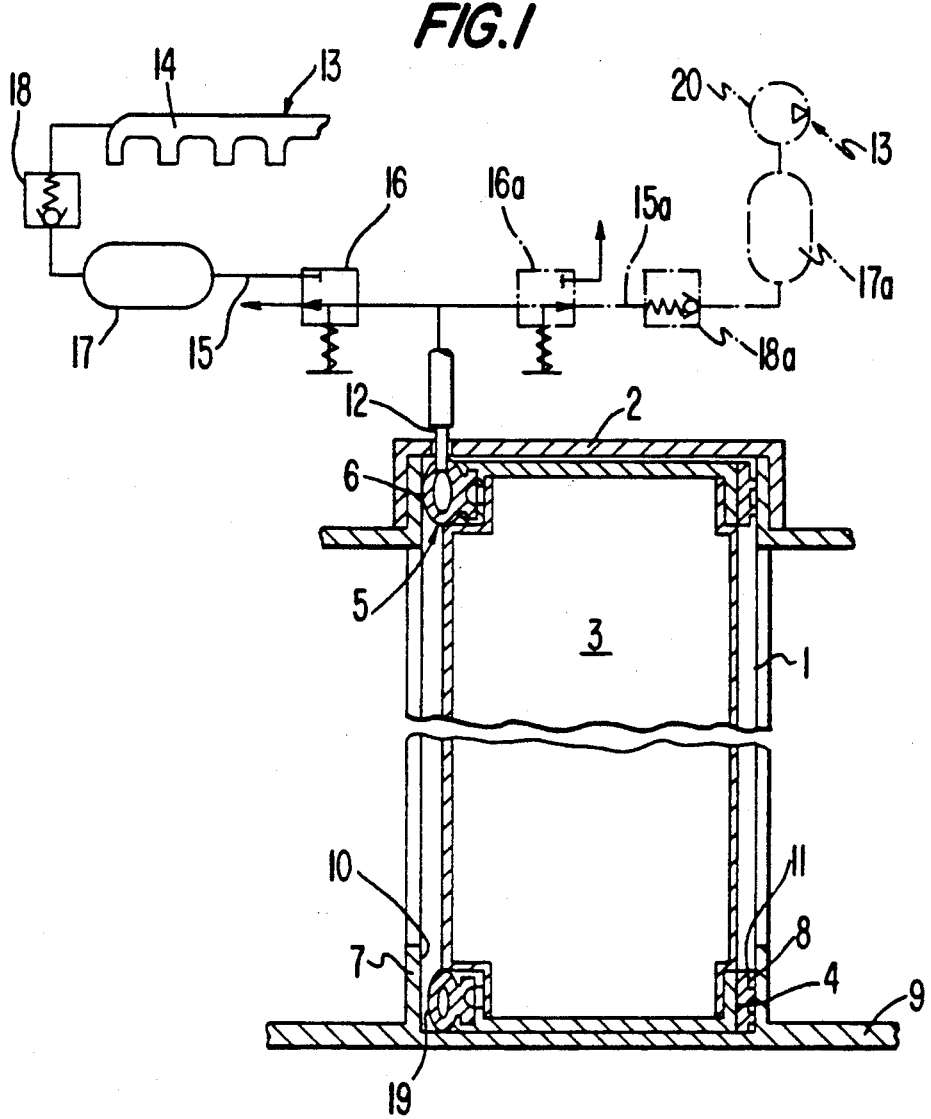
FIG. 1 shows a tubular pressing element fixed to the filter and its connection to two different pressure reducing devices according to various embodiments of the invention.

According to FIG. 1, a filter 3, which is pulled out of a shaft 1 upwards after the removal of a cover 2, is received sealingly via a gasket 4 located on a flow off side for the assisting utilization of the pressure difference between a front and back of the filter 3, the filter 3 being loaded by a pressing element 5 in the form of a continuous hollow chamber 6 made of elastic material. The shaft 1 includes two frame parts 7 and 8 connected to one another, with the exception of the introduction orifice located on the same side as the cover 2, and forms an integral part of a channel 9 assigned to a heating or air conditioning system in a motor vehicle and not shown in detail.

In the top half of the drawing of FIG. 1, a hollow chamber 6 bears with prestress against an associated shaft wall 10 and the gasket 4 is pressed against a shaft wall 11 located opposite the shaft wall 10. The cancellation of the sealing effect is brought about because the hollow chamber 6 has a connection piece 12 which can be connected to a pressure reducing device 13. The pressure reducing device 13 can be a vacuum source and can be formed, for example, by the suction pipe 14 of an internal combustion engine (not shown).

The connection between the connection piece 12 and the suction pipe 14 is made by a line 15, in which a valve 16, a storage vessel 17 and a non-return valve 18 are arranged. Under these preconditions, the elasticity of the hollow chamber 6 is calculated so that, in the illustrated pressureless position in which the valve 16 is connected to the free atmosphere, the hollow chamber 6 bears with prestress against the shaft wall 10.

When the valve 16 is changed over, the hollow chamber 6 is subjected to a vacuum and is compressed, as illustrated at the bottom half of the drawing. A gap 19 forms between the pressing element 5 and the shaft wall 10, with the result that a gap also forms between the gasket 4 and the shaft wall 11 when the filter is being pulled out. The filter 3 can thus be exchanged without great effort and without the danger of damage to the pressing element 5 and the gasket 4.

As indicated on the right in the top half of the drawing of FIG. 1, the pressure reducing device 13 can also include a pump 20 which can be an integral part of a central locking system of a motor vehicle. Placed in the line 15a represented by dot-and-dash lines are a valve 16a, a storage vessel 17a and a non-return valve 18a. This arrangement allows the use of especially flexible pressing elements 5, because, in order to bring about the sealing effect, excess pressure is introduced into the chamber 6 and is then reduced below atmospheric pressure before the filter is exchanged. Here too, the gap formation already described, making it possible to carry out a filter exchange easily, then takes place once again.

Figure 2:
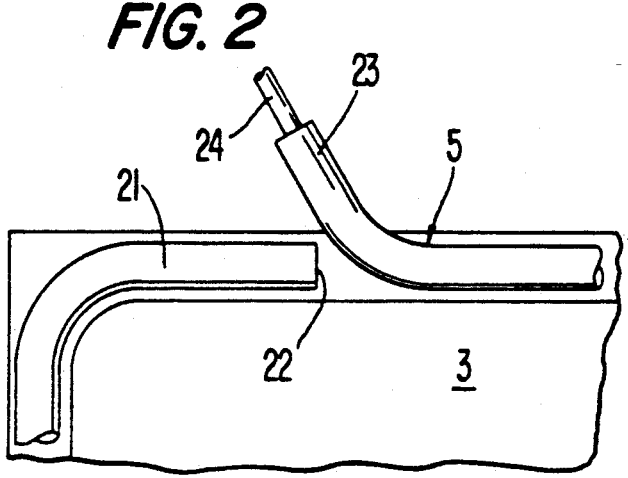
FIG. 2 shows an initial region and end region of a substantially continuous tubular pressing element according to one embodiment of the pressing element.
Figure 3:
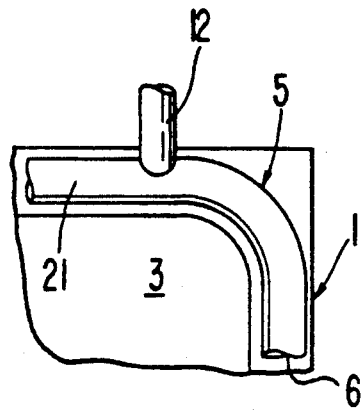
FIG. 3 shows the connection region of a further embodiment of pressing element closed on itself.

It can be taken from FIGS. 2 and 3 that the pressing element 5, which could of course also consist of individual elements connected to one another and arranged distributed all round, is appropriately designed as a tube 21. The tube 21 in FIG. 2 comes in the form of an article sold by the meter, one end 22 being closed and the other end 23 being equipped with a connection piece 24. As is evident from the embodiment of FIG. 3, the tube 21, which is fixed to the shaft and which can at the same time perform the function of an otherwise separate gasket, is closed on itself and is equipped with a connection piece 12.

Figure 4:
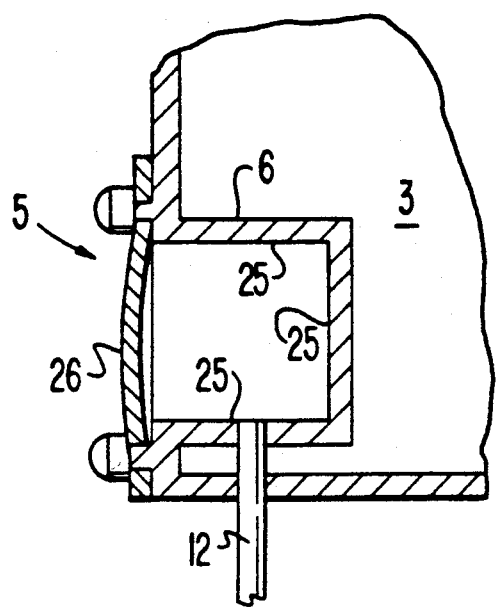
FIG. 4 shows yet a further embodiment of the pressing element with fixed wall regions.

In the exemplary embodiment according to FIG. 4, the pressing element 5 of which once again has the form of a continuous hollow chamber 6, wall parts 25 of the latter consist of frame parts of the filter 3, from which a connection piece 12 leads away. The closure of the hollow chamber 6 is formed by a diaphragm 26 made of especially elastic material, which bulges when pressure is introduced into the pressing element 5 and which Provides the necessary sealing effect by bearing against the associated shaft wall.

Figure 5:
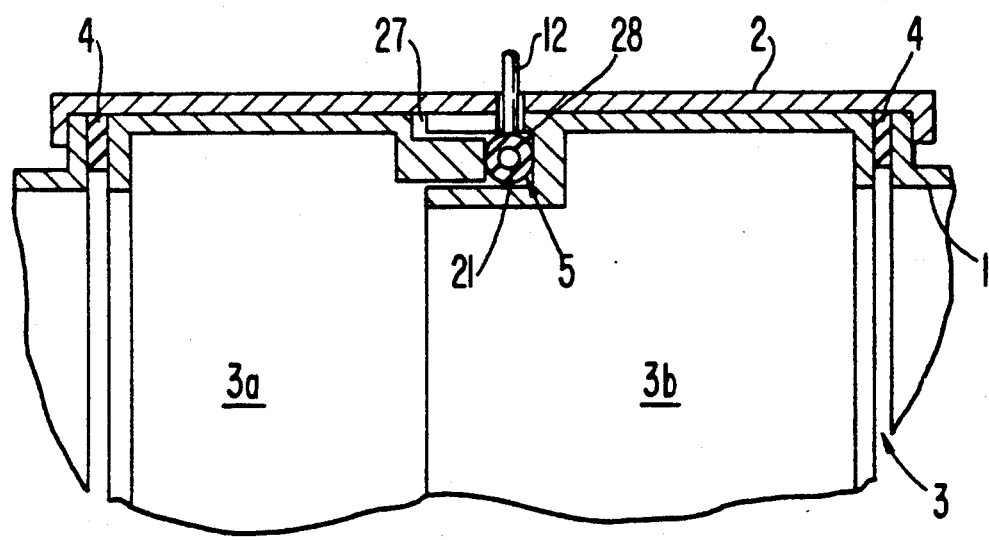
FIG. 5 shows a two-part filter with a pressing element arranged in the region of division.

As shown in FIG. 5, a filter 3 divided transversely relative to the throughflow direction and consisting of filter segments 3a and 3b can also be used. This form is chosen especially when, in addition to a dust filter, an absorption filter is also provided. Formed in the region of the division 27 covered on top by a cover 2 is a groove 28, into which the tube 21 equipped with a connection piece 12 is embedded. When pressure is introduced into the tube 21 or when atmospheric pressure is built up in this as described with respect to previous embodiments, the two filter segments 3a and 3b are pressed against the associated gaskets 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A filter holding arrangement for holding a throughflow filter in a flow shaft, comprising:

sealing gasket means disposable between a first shaft support wall means and a first side of a removable filter insert, and pressing element means disposed between a second shaft support wall means and a second side of the removable filter insert, said second side facing oppositely of said first side, said pressing element means serving to press the filter insert into sealing engagement against said sealing gasket means, wherein said pressing element means comprises flexible hollow chamber means and fluid control means communicating with the hollow chamber means for selectively changing the internal pressure in the hollow chamber means between a filter insert holding position pressing the filter insert against said sealing gasket means and a filter exchange position releasing pressure on the filter insert and thereby permitting exchange of the filter insert from said shaft.

2. An arrangement according to claim 1, wherein said pressing element means is connected to the filter insert.

3. An arrangement according to claim 1, wherein said pressing element means is connected to said second shaft support wall means.

4. An arrangement according to claim 1, wherein said pressing element means extends at said second side of the filter insert in a manner substantially surrounding an intended throughflow opening to the filter insert.

5. An arrangement according to claim 1, wherein said pressing element means includes a closed end and an opposite end opening to the fluid control means.

6. An arrangement according to claim 1, wherein said pressing element means includes a connection piece opening to the fluid control means.

7. An arrangement according to claim 1, wherein the filter insert is divided into a plurality of filters disposed in series in the throughflow direction, and wherein the pressing element means is disposed intermediate said filters and serves to press said filters in opposite directions toward respective ones of said first and second shaft support wall means.

8. An arrangement according to claim 7, wherein said flexible hollow chamber means is configured to be in said filter insert holding position when exposed to atmospheric pressure, said fluid control means including means for reducing the pressure below atmosphere with resultant movement of the hollow chamber means to the filter exchange position.

9. An arrangement according to claim 8, wherein said flexible hollow chamber means defines a gap between the second shaft support wall and the hollow chamber means when in said filter exchange position.

10. An arrangement according to claim 1, wherein said flexible hollow chamber means is in said filter insert holding position when exposed to atmospheric pressure, said fluid control means including means for reducing the pressure below atmosphere with resultant movement of the hollow chamber means to the filter exchange position.

11. An arrangement according to claim 10, wherein said pressing element means is connected to the filter insert.

12. An arrangement according to claim 10, wherein said pressing element means is connected to said second shaft support wall means.

13. An arrangement according to claim 10, wherein said flexible hollow chamber means defines a gap between the second shaft support wall and the hollow chamber means when in said filter exchange position for accommodating filter exchange.

14. An arrangement according to claim 13, wherein said pressing element means is connected to the filter insert.

15. An arrangement according to claim 13, wherein said pressing element means is connected to said second shaft support wall means.

16. An arrangement according to claim 1, wherein said flexible hollow chamber means defines a gap between the second shaft support wall and the hollow chamber means when in said filter exchange position for accommodating filter exchange.

17. An arrangement according to claim 16, wherein said pressing element means is connected to the filter insert.

* * * * *